United States Patent [19]

Onodera et al.

[11] 4,417,153

[45] Nov. 22, 1983

[54] HIGH FREQUENCY SWITCHING CIRCUIT

[75] Inventors: Toshihiro Onodera, Kunitachi; Youichi Masuda, Yokohama; Akira Nakajima, Yokosuka; Yoshio Takamura; Seiji Kajiwara, both of Yokohama; Shoichi Higo, Zama, all of Japan

[73] Assignee: Tokyo Shibaura Denki Kabushiki Kaisha, Kawasaki, Japan

[21] Appl. No.: 349,094

[22] Filed: Feb. 16, 1982

[30] Foreign Application Priority Data

Feb. 17, 1981 [JP] Japan .................................. 56-21938

[51] Int. Cl.$^3$ ............................................ H01H 47/00
[52] U.S. Cl. .................................... 307/140; 307/417; 307/418; 330/8
[58] Field of Search ............... 307/415, 416, 417, 418, 307/126, 129, 140, 141.4; 330/8, 63

[56] References Cited

U.S. PATENT DOCUMENTS 2,875,351 2/1959 Collins ................................ 307/417
3,246,170 4/1966 Olshan ................................ 307/417
4,377,758 3/1983 Kiwaki ................................ 307/418

FOREIGN PATENT DOCUMENTS
47-41118 12/1972 Japan .

OTHER PUBLICATIONS

"Class E . . . A New Class of High Efficiency Tuned Single Ended Switching Power Amplifier" N. O. Sokal et al. IEEE vol. SC-10, Jun. 1975.
Japanese Patent Disclosure (Kokai) No. 47-41118 filed 12/12/72 "Flyback EHT and Sawtooth Wave Generator".

Primary Examiner—Elliot A. Goldberg
Attorney, Agent, or Firm—Cushman, Darby & Cushman

[57] ABSTRACT

A single-ended switching circuit is constituted by a primary winding of a transformer, a switching circuit connected between the primary winding and a DC power supply and on-off operated with a predetermined cycle and also with a predetermined "on" period and a resonance capacitor connected in parallel with the primary winding. A magnetic amplifier, a rectifying element and a choke coil are connected in series between a secondary side circuit of the transformer and the load. The magnetic amplifier includes a saturable reactor which is held saturated during a half cycle of the voltage induced in a secondary winding of the transformer and remains unsaturated during the other half cycle of the voltage.

20 Claims, 4 Drawing Figures

HIGH FREQUENCY SWITCHING CIRCUIT

BACKGROUND OF THE INVENTION

This invention relates to high frequency switching circuits and, more particularly, to a high frequency switching circuit using a single-ended switching circuit.

As the power source for computer system peripheral units and conventional communication devices, low-voltage, high-current stabilized power sources have been used. These power sources are, in many cases, switching power sources, which have the advantages of small size, light weight and high frequency. Among these switching power sources, those which make use of voltage or current resonance waves have sufficient switching efficiency of a main switching element (such as a transistor, a thyristor, a MOSFET, etc.) and can operate with low noise. As one variety of the switching circuit used for the prior art switching power source, there is a subclass-E switching circuit. This subclass-E switching circuit is constructed such that a voltage having a waveform corresponding to the arc of the resonance waveform appears between the terminals of a switching element. To this end, the switching cycle and conduction period of the switching element and constants of external circuitry are set to meet predetermined conditions. Of such subclass-E switching circuit, those which use a voltage resonance waveform have power conversion efficiencies in excess of 90% at the operating frequency of several 100 kHz. As another variety of the switching circuit of the aforementioned kind, there is a half-bridge type switching circuit. In this switching circuit, the peripheral circuitry is constructed such that the waveform of current flowing through a switching element corresponds to the resonance waveform. This type of switching circuit has an advantage in that a quenching circuit can be omitted in case when the switching element is a thyristor. In this switching circuit, however, the resonance frequency is determined by the combination of the rating values of construction elements of an external circuit. Therefore, when this switching circuit is used for a stabilized power source or a power amplifier, the control of the output power is complicated. For example, with a forward type switching circuit the power control can be obtained by merely changing the conduction period of the switching element, but with a switching circuit which makes use of a resonance waveform it is necessary to control the switching cycle in a predetermined relation to the conduction period while controlling the conduction period in order to obtain power control while maintaining the resonance waveform. For this reason, the power control is complicated, that is, the control circuit is complicated. Further, although power control may be obtained with a complicated power control circuit, the available range of the control is narrow, and a desired stabilized power source or power amplifier cannot be obtained. Further, with the voltage resonance type switching circuit based on a forward type switching circuit, in which the current flowing through a switching transistor is a triangular current, the utility of the transformer is inferior; for example, where the output is 100 W or above, the bulk of the transformer is greater than that of the transformer of the ordinary forward type switching circuit by 30% or above. Further, since large ripple current flows through a filtering capacitor, a capacitor of a large capacity is necessary.

SUMMARY OF THE INVENTION

An object of the invention, accordingly, is to provide a voltage resonance type high frequency switching circuit, which can control power over a wide range while maintaining a voltage resonance waveform and also permits improvement of the utility of the transformer and reduction of the ripple of the filtering capacitor.

In the voltage resonance type high frequency switching circuit according to the invention, a single-ended switching circuit is constituted by a primary winding of a transformer, a switching circuit connected between the primary winding and a power supply and on-off operated with a predetermined cycle period and also with a predetermined conduction period and a resonance capacitor connected in parallel with the primary winding. A magnetic amplifier, a rectifying element and a choke coil are connected in series between a secondary side circuit of the transformer and the load. The magnetic amplifier includes a saturable reactor which is held saturated during a half cycle of the voltage induced in a secondary winding of the transformer and remains unsaturated during the other half cycle of the voltage.

DETAILED DESCRIPTION OF THE PREFERRED EMBODIMENT

Figure 1:
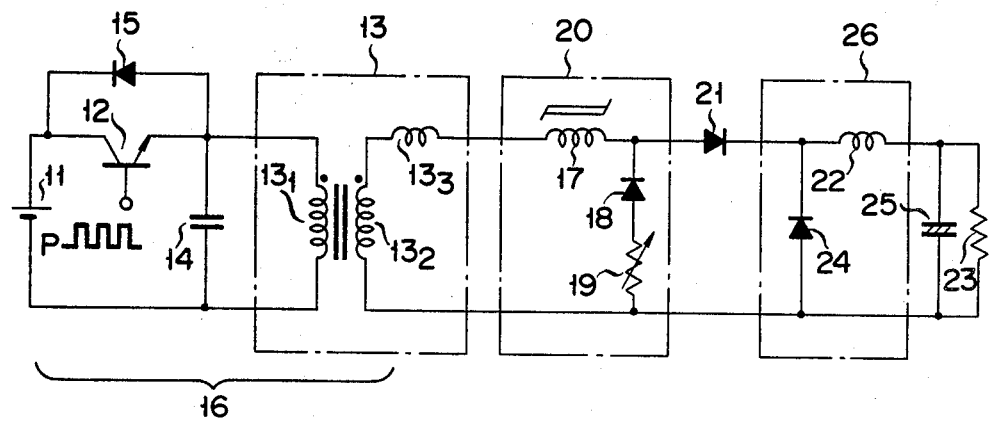
FIG. 1 is a circuit diagram showing one embodiment of the single-ended high frequency switching circuit according to the invention.

Referring to FIG. 1, a DC power supply 11 is connected at its positive terminal to the collector of a transistor 12 which serves as a switching element. A switching pulse train P with a predetermined cycle and a predetermined pulse width is supplied to the base of the transistor 12. The emitter of the transistor 12 is connected through the primary winding $13_1$ of a transformer 13 to the negative terminal of the power supply 11. A resonance capacitor 14 is connected in parallel with the primary winding $13_1$ of the transformer, and a damper diode 15 is connected between the collector and emitter of the transistor 12 in a reverse direction. The transistor 12, transformer 13, resonance capacitor 14 and damper diode 15 constitute a single-ended switching circuit 16. The secondary winding $13_2$ of the transformer 13 is connected at one end through a coil $13_3$ to one end of a saturable reactor 17, the other end of which is connected to the cathode of a reflux diode 18. The anode of the reflux diode 18 is connected through a variable resistor 19 to the other end of the secondary winding $13_2$. The saturable reactor 17, reflux diode 18 and variable resistor 19 constitute a magnetic amplifier 20.

The other end of the saturable reactor 17 is connected to the anode of a rectifier diode 21, the cathode of which is connected through a filtering choke coil 22 to a load 23 in parallel with a filtering capacitor 25. A reflux diode 24 is connected through the choke coil 22 to the parallel circuit of the load and filtering capacitor.

Figure 2:
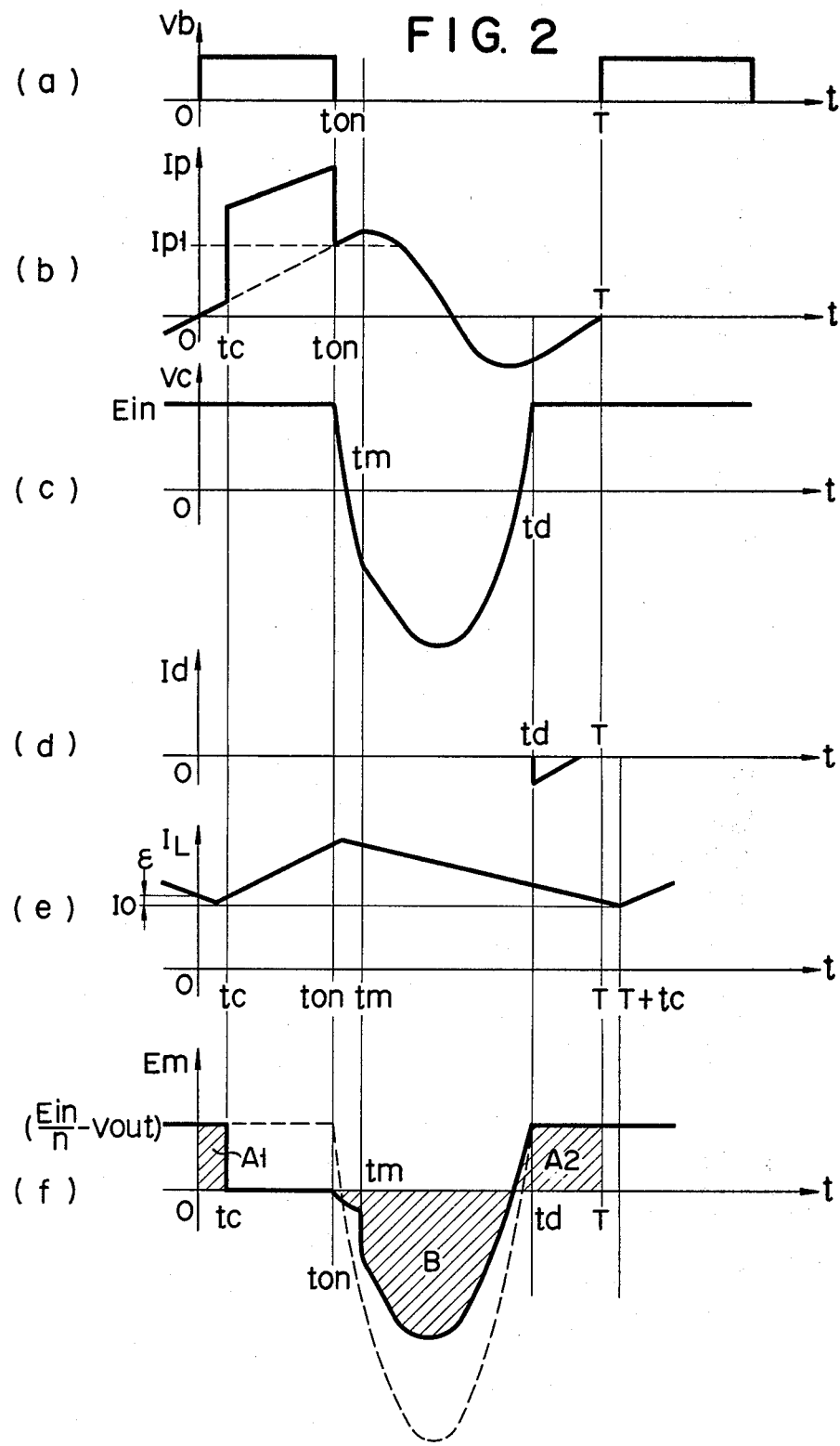
FIG. 2 is a time chart for illustrating the operation of the high frequency switching circuit of FIG. 1.

In a state with the switching transistor 12 turned on at an instant t0 in (a) in FIG. 2, the saturable reactor 17 is not yet saturated. In this state, a closed circuit is formed by the power supply 11 and the primary winding $13_1$ of the transformer 13, and an excitation current Ip flows through this closed circuit with a slope as shown in (b) in FIG. 2. Also, during this period, i.e., period $t0 < t \leq t_c$, a closed circuit is formed by the load 23, smoothing choke coil 22 and reflux diode 24. Since the current $I0 + \epsilon$ at the instant t0 in (e) in FIG. 2 has inertia, it flows through the load until it is changed from $I0 + \epsilon$ to $I0$. When the saturable reactor 17 is saturated, the load current smoothing circuit 26 is conductively coupled to the secondary side circuit of the transformer 13, so that current is caused to flow from the power supply 11 through the transistor 12 and transformer 13 as shown in (e) in FIG. 2. The current through the transistor 12 is sharply increased up to a value equal to the primary side current corresponding to the load current I0, as shown at the instant t0 in (b) in FIG. 2. This state is continued until an instant $t_{on}$ when the transistor 12 is turned off. The rectifier diode 21 is held "on" until the magnetic energy stored in the leakage inductance of the transformer 13 and the saturable reactor 17 is completely dissipated after the transistor 12 has been turned off. The current Ip1 that has been flowing in the excitation inductance of the transformer 13 turns to flow into the capacitor 14 to negatively charge the capacitor 14. This state is shown for a period $t_{on}$-$t_m$ in (c) in FIG. 2. Meanwhile, the variable reactor 17 has not yet been saturated with the inertial current in the leakage inductance of the transformer 13, so that even when a negative pulse voltage induced in the secondary winding $13_2$ of the transformer 13 is coupled through the variable resistor 19 and diode 18, a voltage is produced across the reactor 17 due to the inductance of the saturable reactor 17 at the time of the saturation. This situation is shown for the period $t_{on}$-$t_m$ in (f) in FIG. 2. During the period until the terminal voltage $V_c$ across the capacitor 14 returns to the source voltage Ein after reaching a negative maximum value, the following three closed circuits are formed; (i) a closed circuit formed by the capacitor 14 and the primary side circuit of the transformer 13, (ii) a closed circuit formed by the secondary side circuit of the transformer 13 and magnetic amplifier 20, and (iii) a closed circuit formed by the choke coil 22, load 33 and reflux diode 24. In the closed circuit (i), resonance is produced between the capacitor 14 and the excitation inductance $L_p$ of the transformer 13. The waveforms of the resonance current and resonance voltage are shown for a period $t_m < t \leq t_d$ respectively in (b) and (c) in FIG. 2. In the closed circuit (ii), the magnetic amplifier 20 is reset by the negative voltage pulse induced in the secondary winding $13_2$ of the transformer 13. The reset voltage waveform is shown for the period $t_m < t \leq t_d$ in (f) in FIG. 2. The area B defined by the negative half of the sine wave is equal to the area (A1+A2) defined by the positive part of the waveform. By varying the area B with the variable resistor 19 shown in FIG. 1, the positive area A1+A2 is correspondingly varied, and in this way the output power can be controlled.

In the closed circuit (iii), the choke coil 22 continuously causes current flow into the load 23 as shown in (e) in FIG. 2.

Finally, during the period of conduction of the damper diode 15, three closed circuits are formed, namely (i) a closed circuit formed by the power supply 11 and transformer 13, (ii) a closed circuit formed by the secondary side of transformer 13, saturable reactor 17, rectifying diode 21 and reflux diode 24, and (iii) a closed circuit formed by the choke coil 22, load 23 and reflux diode 24. In the closed circuit (i) the residual current in the excitation inductance Lp of the transformer 13 is returned through the damper diode 15 to the power supply 11. In the closed circuit (ii) the saturable reactor 17 is excited in the saturating direction by the positive voltage induced in the secondary winding $13_2$ of transformer 13. The current flowing through the reflux diode 24 is the sum of the inertial current through the choke coil 22 and excitation current through the saturable reactor 17, and the polarity of this sum current thus coincides with the direction of conduction of the reflux diode 24. In the closed circuit (iii), the inertial current $I_L$ in the choke coil 22 flows through the reflux diode 24 into the load 23. This state is shown for a peiod $t_d < t \leq T$ in (b) in FIG. 2.

The above sequence of events constitutes one cycle of the basic operation, and it is repeated once and again.

It is to be appreciated that with the switching circuit described above, by varying the reset area B (shown in (f) in FIG. 2) for the saturable reactor 17 with the saturable reactor 17 the gating period $t_c$-$t_{on}$ can be varied to control power supplied to the load 23. During this period, the waveform of the terminal voltage across the capacitor 14 is maintained in the resonance arc. Thus, a highly efficient switching can be realized by the switching transistor 12 with substantially no transition loss resulting at the time of the transition from the "on" state to the "off" state and also from the "off" state to the "on" state.

Further, the current flowing through the transistor 12 for the period $t0 < t \leq t_{on}$ is trapezoidal as shown in (b) in FIG. 2. Thus, the voltage Ein of the power supply 11 can be made constant, so that it is possible to permit transmission of increased power compared to the conventional flyback switch circuit. The increase of the power transmission capacity with a constant change in the core flux density B of the transformer 13 means an improvement of the utility of the transformer 13. In other words, with the same power output the temperature rise of the transformer 13 can be reduced, and also with a constant temperature rise the transformer 13 can be reduced in size. Further, since the ripple current can be reduced it is possible to reduce the size and capacitance of the smoothing capacitor 25.

Figure 3:
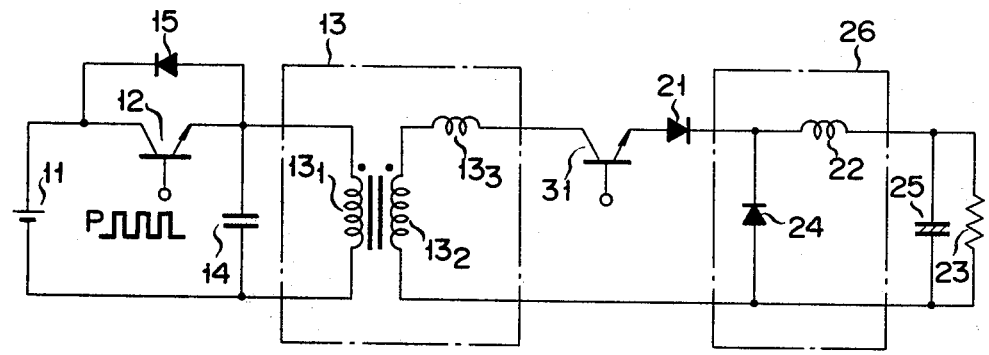
FIG. 3 is a circuit diagram showing a different embodiment of the high frequency switching circuit, in which a switching transistor is provided on the secondary side of transformer.

FIG. 3 shows a different embodiment of the invention. In the Figure, like parts as those in FIG. 1 are designated by like reference numerals. This embodiment of the high frequency switching circuit is obtained by replacing the magnetic amplifier 20 shown in FIG. 1 with a switching element with a control terminal, for instance a transistor 31. The transistor 31 is turned on at the instant $t_m$ in FIG. 2 and is forcibly turned off at the instant $t_d$, and the output power is controlled through the on-off control of this transistor 31.

Figure 4:
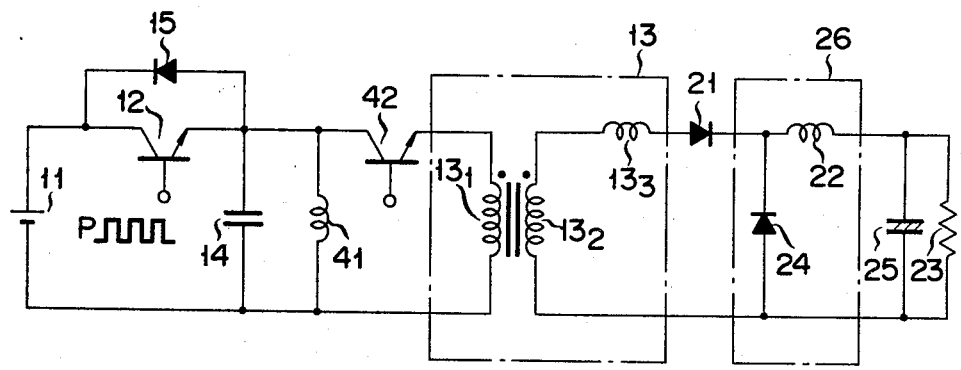
FIG. 4 is a circuit diagram showing a further embodiment of the high frequency switching circuit, in which a switching transistor is provided on the primary side of transformer.

FIG. 4 shows a further embodiment. This high frequency switching circuit is obtained by sufficiently increasing the excitation impedance of the transistor 12 in FIG. 1, providing an inductor 41 in parallel with the capacitor 14 and replacing the magnetic amplifier 20 with a transistor 42, which is similar to that in FIG. 3 but here connected to the primary winding $13_1$ of the transformer 13. Like the preceding embodiment of FIG. 2, the output power is controlled through the on-off control of the transistor 42.

With the constructions shown in FIGS. 3 and 4, the same effects as described in connection with the embodiment of FIG. 1 can be obtained.

While the reflux diode 18 and variable resistor 19 shown in FIG. 1 have been connected between the saturable reactor 17 and the other end of the secondary winding $13_2$ of the transformer 13, even in case where the resistor 19 is connected in parallel with the series circuit of the reflux diode 21 and current smoothing choke coil 22, it is possible to supply the voltage for resetting the saturable reactor 17 to the reactor 17 since the AC impedance of the capacitor 25 is very low.

As has been described in the foregoing, according to the invention it is possible to provide a voltage resonance type high frequency switching circuit, which is used for a power supply circuit using a single-ended switching circuit and can control output power readily and over a wide range while maintaining a voltage resonance waveform as well as permitting improvement of the utility of the transformer and reduction of ripple current through a smoothing capacitor.

What we claim is:

1. A single-ended high frequency switching circuit arrangement, comprising:
   a switching element having a first terminal adapted to be coupled to a first terminal of a DC power source and a second terminal;
   means for ON/OFF operating said switching element with a predetermined cycle and with a predetermined conductive period;
   a transformer having a primary winding including a first end coupled to said second terminal of said switching element and a second end adapted to be coupled to a second terminal of said DC power source;
   a resonance capacitor coupled in parallel with said primary winding;
   magnetic amplifier switching means coupled to the secondary winding of said transformer and held conductive during a half cycle of the voltage induced in said secondary winding and nonconductive during the other half cycle of said voltage;
   rectifying means for rectifying an output of said switching means;
   a choke coil connected between the output terminal of said rectifying means and a load;
   a filtering capacitor connected in parallel with said load; and
   unidirectional means connected to said choke coil, load and filtering capacitor such as to form a closed circuit with said choke coil, load and filtering capacitor,
   wherein said magnetic amplifier includes a saturable reactor connected between one end of said secondary side circuit and said rectifying means, a series circuit connected between the other end of said secondary side circuit and an output terminal of said saturable reactor and formed of a variable resistor and a unidirectional circuit element.

2. A single-ended high frequency switching circuit arrangement, comprising:
   a switching element having a first terminal adapted to be coupled to a first terminal of a DC power source and a second terminal;
   means for ON-OFF operating said switching element with a predetermined cycle and with a predetermined conductive period;
   a transformer having a primary winding having a first end coupled to said second terminal of said switching element and a second end adapted to be coupled to a second terminal of said DC power source;
   a resonance capacitor coupled in parallel with said primary winding;
   magnetic amplifier switching means coupled to the secondary winding of said transformer and held conductive during a half cycle of the voltage induced in said secondary winding and nonconductive during the other half cycle of said voltage;
   rectifying means for rectifying an output of said switching means;
   a choke coil connected between the output terminal of said rectifying means and a load;
   a filtering capacitor connected in parallel with said load; and
   unidirectional means connected to said choke coil, load and filtering capacitor such as to form a closed circuit with said choke coil, load and filtering capacitor,
   wherein said switching means is a switching transistor connected between said secondary winding and said rectifying means.

3. A single-ended high frequency switching circuit arrangement according to claim 1 or 2 further comprising a coil connected between one end of said secondary winding of said switching means.

4. A single-ended high frequency switching circuit arrangement according to claim 1 or 2 wherein said switching element comprises a switching transistor said circuit arrangement further comprising a damper diode connected between a collector and an emitter of said switching transistor.

5. A single-ended high frequency switching circuit comprising:
   a transformer circuit including a primary winding and a secondary side circuit having a secondary winding;
   switching circuit means including first switching means connected between said primary winding and a DC power supply and on-off operated with a predetermined cycle and a predetermined conductive period, and second switching means connected in series with said first switching means and held conductive during a half cycle of a voltage induced in said secondary winding and nonconductive during the other half cycle of said voltage;
   resonance circuit means connected in parallel with said primary winding via said second switching means and including a coil and a resonance capacitor;
   rectifying means for rectifying the output of said secondary side circuit;
   a choke coil connected between the output terminal of said rectifying means and a load;
   a filtering capacitor connected in parallel with said load; and
   unidirectional means forming a closed circuit with said choke coil, load and filtering capacitor for passing inertial current through said choke coil.

6. A switching circuit power supply comprising:
   a switching element having a first terminal adapted to be coupled to a first terminal of a DC power source and a second terminal;
   means for ON/OFF operaing said switching element with predetermined frequency and conductive periods;

a transformer having primary and secondary windings, the primary winding being coupled between said second terminal of said switching element and a second terminal of said DC power source;

a resonance capacitor coupled in parallel with said primary winding;

a magnetic amplifier coupled to said secondary winding;

means for rectifying an output from said magnetic amplifier; and means for filtering an output from said rectifying means and supplying a filtered power signal to a load.

7. A power supply according to claim 6 wherein said magnetic amplifier comprises:

a saturable reactor coupled to a first side of said secondary winding;

a reflux diode coupled to said saturable reactor; and a potentiometer coupling said reflux diode to a second side of said secondary winding, output power of said power supply being controllable by varying the resistance of said potentiometer, the resistance of said potentiometer controll the power delivered by said power supply.

8. A power supply according to claim 6 wherein said filtering means comprises:

a diode in parallel with an output of said rectifying means;

an inductor in series with said rectifying means; and a capacitor coupling said diode and inductor.

9. A switching circuit power supply according to claim 8 wherein said switching element is a switching transistor.

10. A power supply according to claim 6 further comprising a coil coupling said secondary winding to said saturable reactor.

11. A switching circuit power supply comprising:

a first switching element having a first terminal adapted to be coupled to a first terminal of a DC power source and a second terminal;

means for ON/OFF operating said first switching element with predetermined frequency and conductive periods;

a resonance capacitor coupling said second terminal of said first switching element to a second terminal of said DC power source;

a transformer having primary and secondary windings, the primary winding coupling said second terminal of said first switching element to said second terminal of said DC power source;

a second switching element having a first terminal coupled to a first side of said secondary winding and a second terminal;

a rectifier coupled to said second terminal of said second switching element; and means for filtering an output from said rectifier and supplying a filtered power signal to a load.

12. A power supply according to claim 11 wherein said first switching element is a switching transistor.

13. A power supply according to claim 11 wherein said second switching element is a switching transistor.

14. A power supply according to claim 12 wherein said second switching element is a switching transistor.

15. A power supply according to claim 11 further comprising a coil coupling said secondary winding to said second switching element.

16. A switching circuit power supply comprising:

a first switching element having a first terminal adapted to be coupled to a first terminal of a DC power source and a second terminal;

means for ON/OFF operating said first switching element with predetermined frequency and conductive periods;

a resonance capacitor coupling said second terminal of said first switching element to a second terminal of said DC power source;

a first inductor in parallel with said resonance capacitor;

a second switching element having a first terminal coupled to said second terminal of said first switching element and having a second terminal;

a transformer having primary and secondary windings; said primary winding coupling said second terminal of said second switching element to said second terminal of said DC power source;

rectifying means coupled to said secondary winding; and means for filtering an output from said rectifier and supplying a filtered power signal to a load.

17. A power supply according to claim 16 wherein said first and second switching elements are switching transistors.

18. A power supply according to claim 17 further comprising a diode coupled in parallel with said first switching transistor.

19. A power supply according to claim 16 further comprising a second inductor coupling said secondary winding to said rectifier.

20. A power supply according to claim 16 wherein said filtering means comprises a filtering inductor in series with said rectifier and a filtering capacitor coupling said filtering inductor to said secondary winding.

* * * * *